Patented June 20, 1939

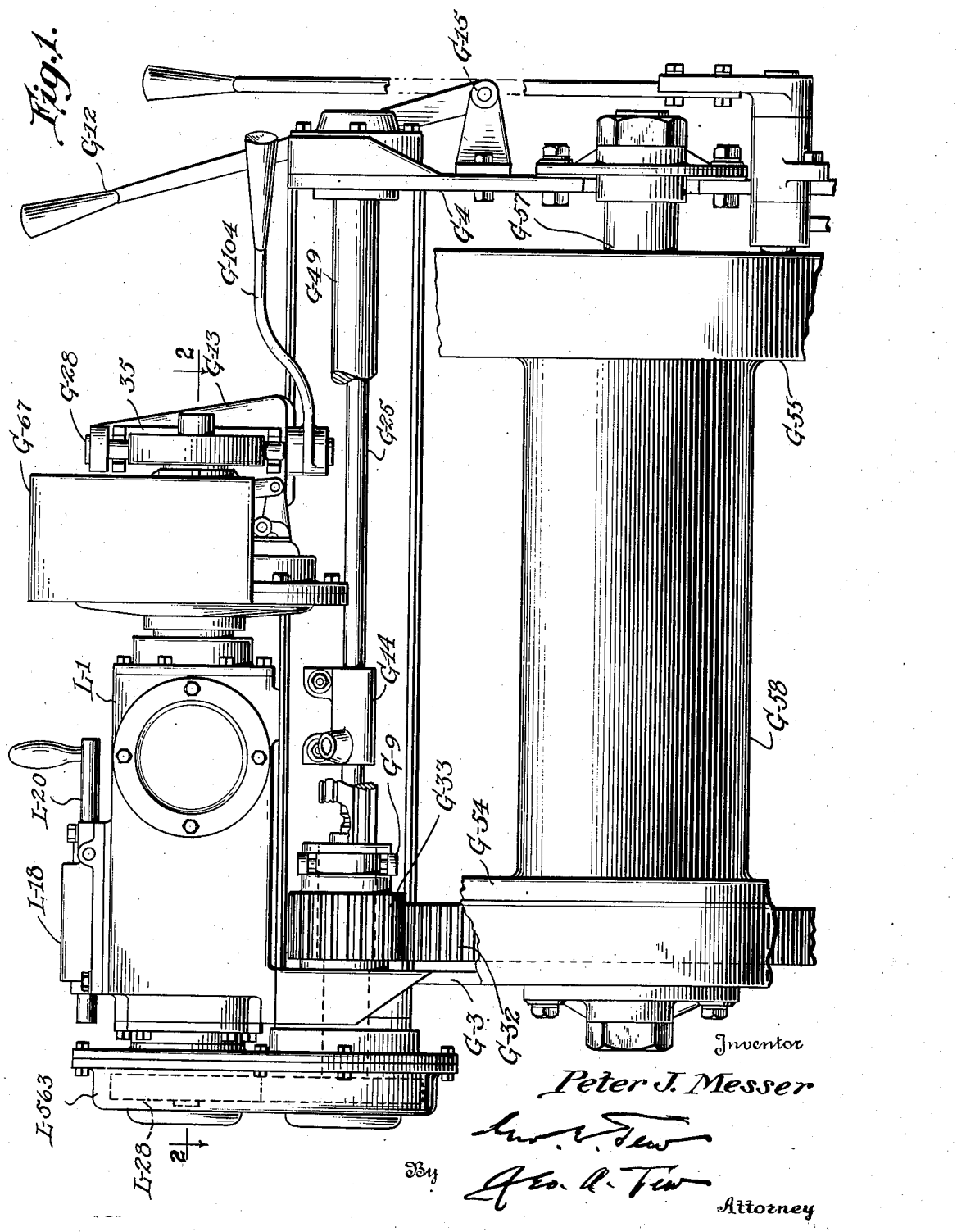

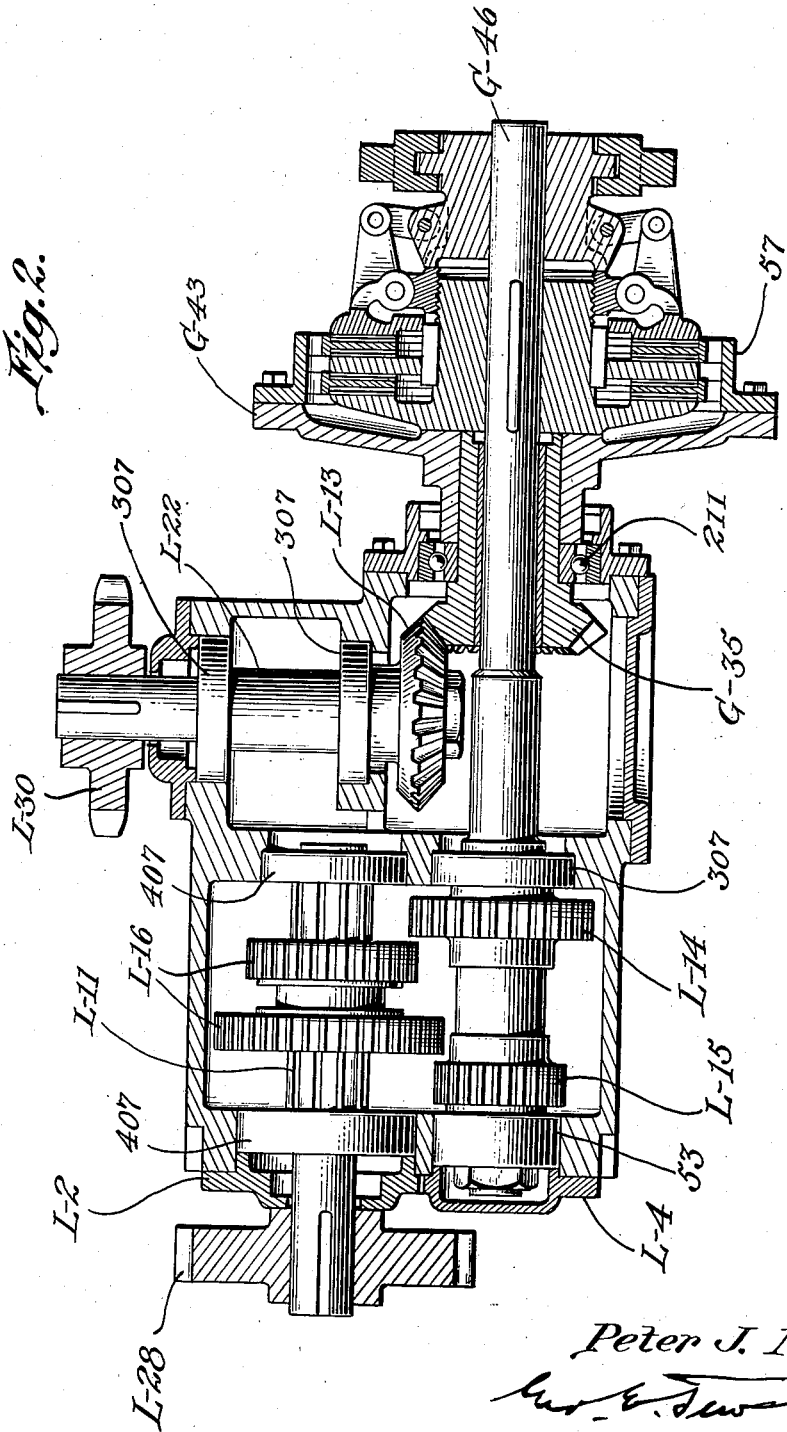

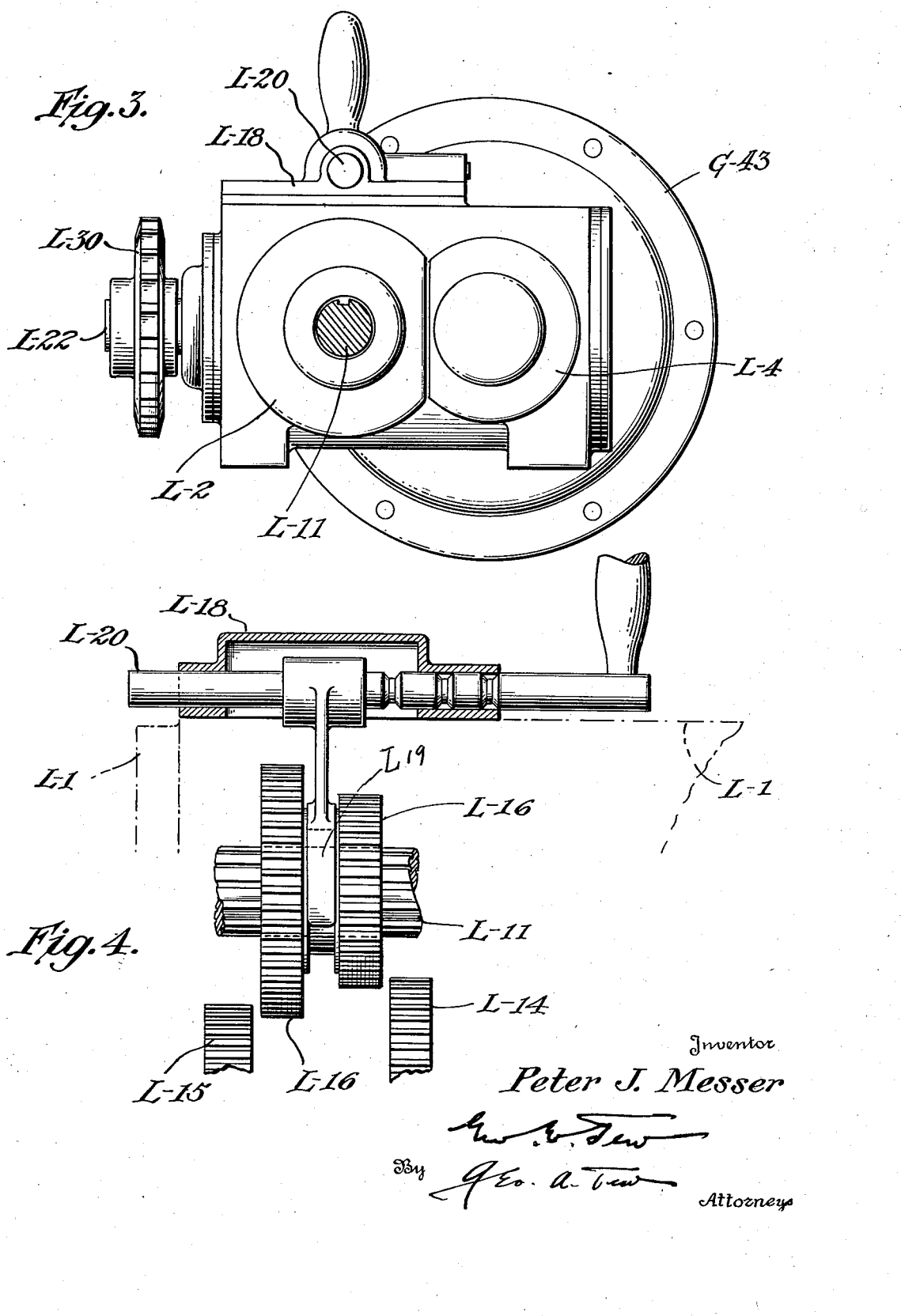

2,162,962

UNITED STATES PATENT OFFICE 2,162,962

WINCH DRIVING GEAR ASSEMBLY

Peter J. Messer, Olean, N. Y., assignor to Luther Manufacturing Company, Inc., Olean, N. Y.

Application September 28, 1937, Serial No. 166,150

4 Claims. (Cl. 254—187)

This invention relates to a winch driving gear assembly including a change speed gear and clutch, particularly intended for use in or on a tractor winch, the power to drive the winch being transmitted from an operating part of the tractor through the clutch and change speed gear to the drum of the winch.

The winch is of the sliding pinion type, in which the drive pinion for the winch is slid or shifted out of mesh to obtain a free drum or spool.

The principle of sliding the drive pinion to obtain a free spool is not new, but due to the fact that a clutch mounted directly on the sliding pinion shaft makes it impossible to obtain a satisfactory low line speed and quite impractical to obtain two speeds on the drum, which sometimes is necessary or desirable in oil field work, the present invention is justified.

To get a satisfactory low speed on the spool or drum, a clutch on the sliding pinion shaft would have to be so large to carry the load that it would be impossible to get a close mounting on the tractor. Such mounting is quite necessary for tractor balance and convenient assembly, and it is quite difficult to protect the clutch from damage as it has to be mounted on the winch frame. There are also various other objections to such a clutch on the sliding pinion shaft.

The present invention discloses a two speed drive (or it could be more) and the clutch is mounted on the high speed shaft. This makes it possible to use a much smaller clutch to handle the load, as the speed reduction is back of the clutch, or between the clutch and the take off to the drum or spool, so that any reduction in speed on the spool will not increase the torque on the clutch.

The clutch and gear box are all in one unit, assembled on top of the winch frame and may be driven from the tractor power take off by a chain or gears. This obtains a close mounting on the tractor due to the gear box mounted on top of the winch, which is a protection to the clutch from obstruction or interference encountered on oil field or other work. It is also possible to obtain two (or more) speeds without affecting the size of the clutch, making the operation of the winch simpler and generally improving its assembly and upkeep.

With these and other objects in view, one form of the invention is illustrated in the accompanying drawings in which:

Fig. 1 is a rear elevation of the assembly shown applied to a winch.

Fig. 2 is a section on the line 2—2 of Fig. 1.

Fig. 3 is an end elevation.

Fig. 4 is a detail of the gear shifter.

In the drawings, L—I is a gear box, properly shaped to support the parts to be described, mounted and supported on the end frames G—3 and G—4 of the winch structure. As will be seen particularly from Fig. 2, a sprocket L—30 is used to receive the power by a suitable belt not shown, connected to a power take off conveniently at the back of a tractor, not shown. This sprocket is keyed to a drive shaft L—22 which runs in bearings 307 in the gear box. At its inner end the drive shaft carries a miter gear L—13 which meshes with a miter sleeve gear G—35 which runs in bearings 211. Fixed on the sleeve gear G—35 is the clutch driving ring flange G—43 to which is bolted the clutch driving ring 57 which encloses a standard twin disk clutch the inner member of which is keyed to the shaft G—46. This clutch may be of any suitable type and no particular description thereof is considered necessary, altho its operating lever is indicated at G—104, operating the clutch yoke 35 on rock shaft G—28, the yoke bracket being indicated at G—13, the lever G—104 being fastened on the lower end of the shaft G—28. A guard G—67 covers the clutch.

As shown, the sleeve gear G—35 extends around the shaft G—46. This shaft extends through the box, and the sleeve gear G—35 runs free on the shaft, the inner end of the shaft running in bearings 307 and 53 in the gear box where they are held in proper position by the end flange or cover L—4.

Fixed on the shaft G—46 are change speed gears L—14 and L—15 adapted to be selectively meshed with one or the other of a double gear L—16 when slid into mesh by a shift rod L—20 and yoke L—19 guided by a cover L—18 mounted on the box (see Fig. 4).

The double gear L—16 is splined to shift on shaft L—11 which runs in bearings 407 in the gear box, and held in place by a cover flange L—2. On the outer end of the shaft L—11 is keyed a gear L—28 which, through gearing in the gear case L—563 drives a shaft G—49 which extends under the gear box or between the gear box and the winch drum. This shaft G—49 carries the sliding pinion G—33 splined thereon which pinion meshes when desired with the drum gear G—32 secured in the usual manner to the flange G—54 of the drum which includes the barrel G—58 and the brake flange G—55 and turns on the suitably supported shaft G—57.

The sliding pinion G—33 is slid into and out of mesh with the drum gear G—32 by a yoke G—9 which is fastened to the inner end of the shift rod G—25 and slides through a lock or latch block G—14 which is provided with the usual spring latch to hold the sliding pinion G—33 as set, in or out of mesh. To the outer end of the shift rod G—25 is connected the operating lever G—12 which is pivoted to the bracket G—15. Fig. 1 shows the pinion in mesh with the drum gear. By pulling the lever back it will slide the pinion out of mesh, giving a free spool or drum.

Other parts need no particular description since the invention is directed particularly to the gear box and clutch assembly with respect to the winch drum and frame, and various modifications may be made within the scope of the following claims.

In operation, power applied to the shaft L—22 is communicated through the bevel gears L—13 and G—35 to the clutch and when the clutch is in, to the shaft G—46 and through its gears L—14 or L—15, to one or the other of the double gear L—16. This gear is shown in Fig. 2 in neutral position. When shifted to high or low speed the shaft L—11 is driven and through the train of gearing L—28 etseq. to the shaft G—49 and thence to the drum gear G—32 at the selected speed. The arrangement is very compact and permits the unit to be readily mounted on the drum frame at the rear end of a tractor or in other confined position. At the same time a change speed gear is provided with reduction in the size of the clutch, to care for varying loads on the drum line; and the sliding pinion drive permits the drum to run free without necessarily disturbing the set of the change speed gear and the clutch.

I claim:

1. The combination of a winch drum and its frame, and operating devices for the drum, all of said devices being mounted and assembled as a unit on the frame above the drum and including a drive shaft, a change speed gear, a clutch operatively connected between the shaft and the said gear, and a shaft provided with a slidable pinion operatively connected between said gear and the drum, the drive shaft being positioned with its axis at an angle to the axis of the clutch, with its inner end between the clutch and the change speed gear, and the clutch and change speed gear being assembled in axial alinement on the top of the frame.

2. The combination of a frame having two upright sides, a winch drum journaled between the said sides below the upper ends thereof, a drive shaft, a clutch driven by the drive shaft, a change speed gear driven by the clutch, said clutch and change speed gear being mounted in line upon the said upper ends and spaced above the drum, a gear on one end of the drum, between said drum and the adjacent side frame, a driven shaft extending across between said side frames and geared at one end to the change speed gear, said driven shaft being located in the space between the clutch and change speed gear and the drum, a shifting pinion on the driven shaft, and means to shift said pinion into and out of mesh with the gear on the end of the drum.

3. The combination stated in claim 2, the means to shift said pinion including a lever pivoted to the side frame and a rod extending in the said space to connection with said pinion.

4. The combination of a winch drum, a frame therefor having two upright sides between which the drum is journaled, the upper ends of said sides projecting above the drum, a gear on one end of the drum, a driven shaft extending across between the said ends of the frame sides and above the drum, a shifting pinion carried by said shaft and adapted to mesh with said gear, a drive shaft, a clutch driven by the drive shaft, and a change speed gear driven by the clutch, said clutch and change speed gear being supported on the upper ends of said sides above said driven shaft and operatively connected to the driven shaft, and independent controlling levers located adjacent each other at one side of the frame and operatively connected to the pinion and the clutch respectively.

PETER J. MESSER.